United States Patent [19]

Pontow et al.

[11] Patent Number: 4,978,369

[45] Date of Patent: Dec. 18, 1990

[54] PROCESS FOR FEEDING CARBONACEOUS MATERIAL INTO REACTION SPACES

[75] Inventors: Bernd Pontow, Dorsten; Hans-Peter Wenning, Raesfeld; Albert Grimminger, Warmbronn; Jurgen Strecker, Stuttgart, all of Fed. Rep. of Germany

[73] Assignees: Veba OEL Entwicklungs-Gesellschaft mbH, Gelsenkirchen; Pfleiderer GmbH, Stuttgard, both of Fed. Rep. of Germany

[21] Appl. No.: 206,131

[22] Filed: Jun. 13, 1988

[30] Foreign Application Priority Data

Jun. 11, 1987 [DE] Fed. Rep. of Germany ....... 3719408

[51] Int. Cl.$^5$ ............................. C10J 3/46; C10J 3/50; C10B 13/00
[52] U.S. Cl. ................................................. 48/197 R
[58] Field of Search ............... 48/197 R, 200, 201, 48/206, 210, DIG. 4; 262/373, 186 R; 414/158, 197, 218; 208/400, 426; 44/596; 201/35; 264/211.21

[56] References Cited

U.S. PATENT DOCUMENTS 2,600,871  6/1952  Helwig .
2,621,083  12/1952  Daniels ........................... 48/DIG. 4
3,976,548  8/1976  Kevorkian et al. ................. 48/86 R
4,106,997  8/1978  Kevorkian et al. .
4,111,665  9/1978  Pasternak et al. .................. 48/86 R
4,197,092  4/1980  Bretz ............................... 48/DIG. 4
4,206,713  6/1980  Ryason ............................. 48/86 R
4,218,222  8/1980  Nolan et al. ...................... 48/86 R
4,255,161  3/1981  Grimminger et al. ............... 48/86 R
4,302,353  11/1981  Escher et al. ..................... 48/206
4,466,809  8/1984  Kissel et al. ..................... 48/197 R
4,583,995  4/1986  Winckler et al. ................... 48/210

FOREIGN PATENT DOCUMENTS 973629  3/1960  Fed. Rep. of Germany .
446268  12/1965  Fed. Rep. of Germany .
1252839  10/1967  Fed. Rep. of Germany .
2930304  3/1980  Fed. Rep. of Germany .
2850121  5/1980  Fed. Rep. of Germany .
2029355  8/1953  United Kingdom .

*Primary Examiner*—Peter Kratz
*Attorney, Agent, or Firm*—Oblon, Spivak, McClelland, Maier & Neustadt

[57] ABSTRACT

Disclosed is a process for feeding carbonaceous materials into pressurized reaction spaces where partial oxidation or hydrogenation occurs. The feed is compressed into a strand material in a rotable screw conveyor which strand is disintegrated by fluid media.

12 Claims, 5 Drawing Sheets

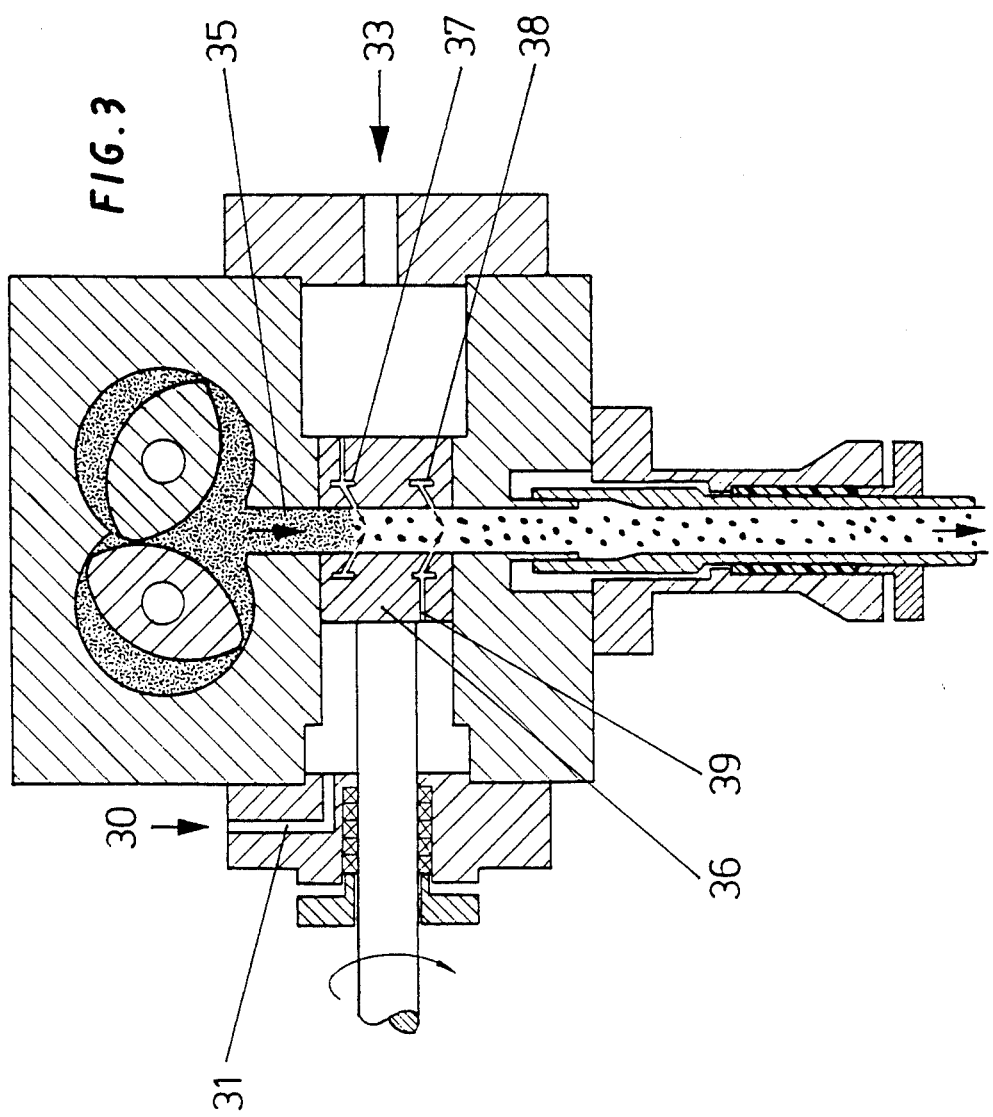

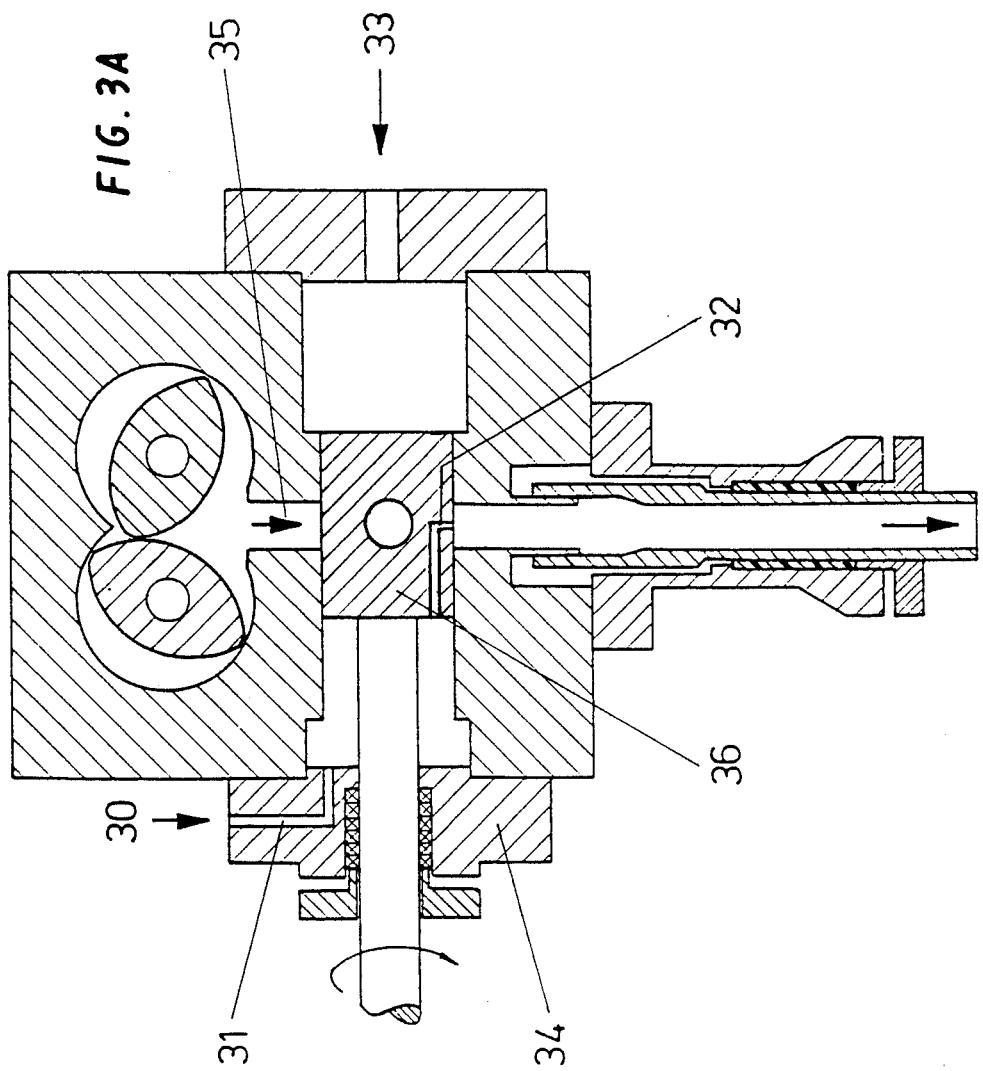

PROCESS FOR FEEDING CARBONACEOUS MATERIAL INTO REACTION SPACES

BACKGROUND OF THE INVENTION

1. Field of the Invention

The invention relates to a process for feeding suspended solid or fluid carbonaceous materials into reactor spaces operating under pressure: solid particles optionally mixed with a suspending agent, binding agent or solid or liquid lubricant, not easily pumpable suspensions, pasty or viscous stocks, melts and the like, as a plug of compressed feed material which is impervious at the pressure predominating in the reactor and is continuously renewed as it enters the latter as a strand of feed material by means of at least one rotatable screw conveyor in a closely fitting housing, and a device for carrying out such a process.

2. Background of the Related Art

Processes for continuous feed of solid fuels into a gasification reactor by means of a twin-screw extruder are described in DE 27 21 047 C3 and also EP 0 065 459 A3.

A proven system for solid feed into a pressure gasification unit is the feed of the solid as a suspension with the use of special pumps (see U.S. Pat. No. 3,607,157). Another possibility is the dry feeding of solid fuel by use of pressure locks, cf. DE 28 56 617 C3.

Feeding with a suspension pump requires a comparatively great amount of added liquid, which limits of the attainable composition of synthesis gas with water as added liquid. Additional devices such as mixers, stirred receiving vessels and circulating pumps are necessary to prepare the solid-liquid suspension and keep it homogeneous.

So-called slurry presses are used for feeding of coal slurry into high-pressure apparatus for coal liquefaction in slurry phase hydrogenation, cf. W. Kroenig, "Die katalytische Druckhydrierung von Kohlen, Teeren und Mineraloelen" [Catalytic pressure hydrogenation of coals, tars and crude oils], Springer-Verlag, Berlin/Goettingen/Heidelberg, 1950, p. 228 ff.

Bergius had already pressed coal mixed with oil, to form a very thick cold paste which was transported by a screw conveyor to the "slurry press", which brought it to the operating pressure and carried it as a cold strand into the high-pressure furnace (cf. W. Kroenig, loc. cit., p. 38).

Therefore, a key component for the operability of processes for conversion or manipulation of materials under high pressure is the system used for feeding of the materials or mixtures of materials into the corresponding reactor spaces operated under pressure, since the materials or mixture of materials must be conveyed against the often very high pressures in the interior of the pressure spaces and at the same time discharge or backfiring of hot and reactive high pressure process gases often present in this type of processes must be reliably avoided. Typical examples for such type of processes are the gasification of carbonaceous materials in the refractory lined reaction zone of free-flow noncatalytic unpacked partial oxidation synthesis gas reactors or the catalytic pressure hydrogenation in slurry phase of carbonaceous materials.

A suitable device in the form of at least one screw conveyor, rotatable in a closely surrounding housing, for the introduction of solid fuels into a pressure gasification reactor is described in DE 28 50 121 C3.

For expert thinking relative to the introduction of materials or mixtures of materials in the form of solid particles, optionally mixed with a suspending agent or binding agent or not easily pumpable suspensions, pasty or viscous stocks, melts and the like, refer to, among others, W. Wiedmann and W.A. Mack, "The Use of Twin Screw Extruders for Feeding Coal Against Pressures of up to 1500 psi," Proceedings of the Conference on Coal Feeding Systems held at the California Institute of Technology, Pasadena, Calif., June 21–23, 1977. According to this publication, uniformly rotating twin screw extruders are especially suitable because of their feed and conveying behavior, the favorable wear behavior, and the self-cleaning capability of the partially or completely meshing twin screw system.

With the use of a screw extruder as the introduction system into a free-flow partial oxidation gasification reactor, the solid must be introduced into the gasification reactor with a highly constant flow rate. Disturbances of the solid fuel feed into the gasification reactor can lead to momentary initiation of combustion of the present synthesis gas with the oxygen containing gases charged to the gasification reactor. The consequences of such trouble are suddenly rising gasification temperatures and a great danger to the refractory lined reaction zone of the gasification reactor.

With the use of an extruder for feeding against pressure of the carbonaceous charge material into the reactor for free-flow partial oxidation, the liquid and inert gas ballast can be considerably reduced. The charge stock is introduced at the upstream end of the extruder, driven downstream by the rotation of the screw(s) and mixed with a liquid or solid lubricant, for example, water or oil. The proportion of this binding agent is smaller than the amount required for the suspension process. The binding agent and solid are mixed to a homogeneous paste in the mixing zone of the extruder. In the pressure buildup area of the extruder the solid is brought to a pressure above the reactor pressure by formation of a plug of compressed charge material which is impervious at the pressure predominating in the reactor and is continuously renewed as it enters the latter. After entry in the pressure reactor space the strand of carbonaceous charge material is conveyed through a nozzle in the so-called delivery head and disagglomerated and disintegrated by one or more gas or liquid jets and pneumatically conveyed into the reaction space, where, for example, after addition of a gasification agent such as gaseous oxygen, oxygen containing gases or air, partial oxidation which can be made up to synthesis gas takes place, or after addition of hydrogen under the typical conditions of slurry-phase hydrogenation, liquefaction takes place to recover useful products.

Since the mixing, conveying and pressure buildup take place in the extruder, other related peripheral equipment is eliminated. The reliability of the introduction system achieved with an extruder, however, is more problematic because of existing conditions, since the seal between the pressure space of the reactor and the upstream side of the system is achieved only by the dynamically acting solid plug of carbonaceous charge material, which is impervious at the pressure in the reactor.

SUMMARY OF THE INVENTION

The object of the invention, especially during start-up and shutdown procedures or in case of a breakdown, is to prevent the escape to the outside of gaseous reactants or reaction products and also to make as quick and trouble-free a restart as possible against the pressure prevailing in the reaction space.

Another object of the invention is a reduction of the great wear of the pipe walls in the delivery head by high-pressure gas, steam or also liquid jets directed at the strand of carbonaceous charge materials in the device for disagglomerisating and disintegrating the continuously extruded strand.

Another object of the invention is a process for feeding into pressure spaces of carbonaceous materials optionally mixed with a suspending agent, binding agent or solid or liquid lubricant, not easily pumpable suspensions, pasty or viscous stocks, melts and the like, which are compressed to a gastight plug of charge material by at least one rotatable screw conveyor in a closely fitting housing, and the solid stock plug is conveyed by a delivery head with a solid nozzle and at least one closure member into a pressure space.

Besides the function of sealing of the delivery head, the stock plug in the delivery head must again be disintegrated so that it can be converted to as finely divided a form as possible in the pressure space, in which the most varied types of conversions or reactions are to take place. In this case, the solid is disagglomerated by one ore more pressure media, for example, high-pressure steams or gas jets or liquid jets under high pressure. The degree of reduction in size reached in the delivery head can be decisive for the reaction that can be achieved in the pressure spaces.

The disintegration of the strand of charge material can take place with a highly heated liquid, e.g., a binding agent, hydrocarbon containing liquid reaction products from extraneous sources or from process recycle streams or a highly heated gas, which, depending on the type of reactions to be performed in the pressure spaces, can be an inert gas, for example nitrogen, a moderator gas, for example steam, or a reactive gas, for example, hydrogen, carbon dioxide, carbon monoxide or recirculated process gas, or an oxygen-containing gas such as air.

For example, in a process of the above-mentioned type combustible materials can be subjected together with an oxygen-containing gas to a gasification reaction in a fluid stream gasification reactor, organic or synthetic, hydrogenable materials containing uncrosslinked or also crosslinked carbon chains, optionally in mixture with residual oils, heavy oils with a crude oil base or of other origin, or finely ground coal can be subjected to a hydrogenation treatment under the typical conditions of a slurry-phase hydrogenation, extractable materials can be subjected to a pressure extraction for supercritical or subcritical reaction in extraction reactors, or materials suitable for low-temperature carbonization or pyrolysis can be subjected to a pyrolysis under pressure.

Suitable as stock for fluid stream gasification are solid fuels, e.g., brown coal, hard coal, hard coal coke, petroleum coke, and as liquid additives may be used liquid fuels and lubricants such as oils, sulfite waste liquor or molasses, which are reacted with oxygen gas or oxygen-containing gases, optionally in the presence of steam or water.

For a hydrogenating treatment under typical conditions of a slurry-phase hydrogenation, finely ground brown or hard coal in mixture with oils originating from extraneous sources or from process recycle streams are suitable as materials or material mixtures to be introduced into the high-pressure hydrogenation reactor. But there can also be used, optionally in mixture with the above-mentioned materials, sewage sludges from primary settling tanks, biological clarification, digestion towers, paint sludges, halogen-containing solvents or their distillation residues from recycling processes, PCB-containing or halogen-containing waste oils, which can also carry a certain solids content, transformer oils, hydraulic oils, organic residues from dry cleaning operations, organic residues from metal degreasing or dry cleaning baths, deposit seepage oils, bilge oils, tank cleaning residues, used plastics, plastic waste, plastic production scraps, old tires from automobiles or machines, rubber or plastic hoses, transmission belts, sealing rings and sealing materials made from rubber or plastic, the last mentioned materials suitably after appropriate reduction in size or converting into a slurry or paste and the like.

For said stocks which after appropriate working up, optionally drying, reduction in size and making into paste, accumulate as not easily pumpable suspensions, pasty or viscous stocks or melts, introduction into the pressure space for the liquid-phase hydrogenation by means of a twin-screw uniformly rotating extruder is particularly suitable, e.g., upstream or downstream from a preheater. Preheating or fusion of the stocks can also take place by appropriate heating devices through the housing wall and/or by introducing the equivalent energy under intensified shearing of the feed material in the extruder.

Feeding of said materials or mixtures of material takes place with particular advantage as lateral introduction from the extruder for example directly into a slurry-phase hydrogenation reactor.

The proposed process is also suitable for introduction of extrudable materials or mixtures of materials in the form of pasty or viscous stocks or melts for supercritical or subcritical reaction, and e.g., hydrocarbons, light gasolines, $N_2O$, $CO_2$ and the like can be used as added gases or extraction agents. Similarly, low-temperature carbonization or pyrolizable substances can be introduced into the pressure spaces.

In the processes for feeding of said materials or mixtures of material into the pressure spaces for hydrogenation, for extraction or pyrolysis it can be advisable to disagglomerate and disintegrate the strand of feed material produced by the feeding device, in the same way as known for the processes for free-flow gasification, by means of high-pressure reactive or inert gases, which can come from extraneous sources or from process recycle streams, or by means of liquids fed under high pressure from extraneous sources or from recycle streams.

For the disintegration of the strand of charge material with a liquid under high pressure, highly heated, hydrocarbon-containing or hydrogen-transferring liquids, solvents and the like as well as mixtures of liquids, depending on the type of reactions performed in the pressure space, are suitable.

For the position of the closure means between extruder and pressure reactor, a design is also suitable in which the closure means is placed downstream from the nozzles for introduction of the pressurized feed material. Also an arrangement of two closure means at the downstream end of each of two ring gap nozzles for the spatially separated feeding of the pressurized feed material in two partial strands is possible.

For disagglomeration and disintegration of the strand of feed material by means of a gas, preferably a gas jet having a velocity between 30 m/s and sonic velocity can be used. As a result, the proposed process can further be configured so that the gas for disintegration respectively disagglomeration of the strand of feed material can be introduced into the disintegration device to be charged into the gasification reactor in two partial streams via respective feed lines whereas in one partial stream the pressure ratio is adjusted so that a supercritical expansion with sonic velocity of the fed gas is resulting and the other partial stream is fed as a regulated amount with gas velocities between 30 m/s and sonic velocity. In this way an optimal disintegration and disagglomeration of the strand of feed or charge material is achieved with the advantage that an amount of fed high-pressure gas is still adjustable in limits. The amount of the fed gas by this configuration is no longer determined solely by the cross section of the nozzle bores or annular nozzles, and there is a possibility, during the reaction, to reduce the amount of gas added, without waiving to the maximum energy input associated with supercritical expansion.

According to another aspect of the invention a device is proposed for carrying out the process in which a closure member provided with a passage opening for the suspension, stock or melt is placed to rotate or slide in a housing hollowed out in the delivery head so that the passage opening may be moved to a shutoff position in which the passage opening is no longer connected with the nozzle duct or the duct continuing to the reaction space.

In a preferred configuration of the proposed device, the closure member, e.g., a shutoff piston, is provided with bores for feeding the high-pressure gas or liquid under high pressure via bores or recesses in the delivery head and via at least one bore, or a ring gas nozzle, a multitude of radially aligned bores or nozzles into the passage opening.

In this way the high-pressure gas or liquid under high pressure is conducted via the bores or recesses in the delivery head into at least one bore, a ring gap nozzle or a multitude of bores or nozzles having their outlet into the passage opening of the closure member.

Only the feeding of the high-pressure gas or of the liquid under high pressure via nozzles directed onto the continuously formed strand of charge material, which serves for disintegration and disagglomeration of the strand of feed material down to a degree to be determined makes the material in the strand sufficiently accessible to the reactions to be performed in the pressure space.

According to another embodiment it is possible to provide the nozzles for the disintegration and disagglomeration of the strand of charge material apart from the closure member, especially downstream from it.

By radial arrangement of the nozzles, preferably so that they conduct at a central point in the passage opening for the strand of feed material, wear on the walls in the delivery head and the solid nozzle as well as of the downpipe and the connecting pipe is considerably reduced, and the inclination of the nozzles is advantageously approximated to the stream direction of the strand of feed material.

An especially preferred configuration of the proposed device provides additional bores in the closure member for feeding of the high-pressure gas or the liquid under high pressure into the downpipe or connecting pipe in the shutoff position of the shutoff piston or closure member. By this arrangement high-pressure gas, inert gas or steam or liquid under high pressure can be introduced into the high-pressure space, which is particularly important in the start-up to warm up of the downpipe or connecting pipe before turning on the shutoff piston. In the case of shutting off after closing of the closure member the downpipe or connecting pipe is run free of solid material by means of the provided additional bores.

The closure member according to the invention in the proposed device can be designed either as a rotating or as a sliding shutoff device. In the embodiment as rotating device, the path from the extruder to the reactor is quickly closed or completely opened by rotation, for example by 90°, e.g. by means of a hydraulic drive.

Except for the different movement in the shutoff, the functions of the rotation embodiment and the sliding embodiment of the closure member, which can have in their most simple form the shape of a piston are the same. In the sliding embodiment, the ducts or bores for feeding high-pressure gas or liquid under high pressure can also be integrated in the shutoff piston, and also in this case no additional switching or control devices are necessary for this function.

A length expansion compensator or expansion joint of the downpipe respectively the connecting pipe is suitably integrated in the delivery head. This compensator absorbs the length expansion between the stationary extruder and reactor, which occurs because, for example, the steel jacket of the reactor and the downpipe and connecting pipe expand during the operation because of the temperature rise. The compensator can be made in a known way for example as a stuffing-box compensator.

The configuration of the proposed device with a delivery head connected laterally to the housing of the extruder, makes it particularly suitable as an introduction device for fluid stream gasification but also for lateral introduction into a reactor for slurry-phase hydrogenation.

For example, in the operation with the axial delivery head described in DE 28 50 121 C3, wear occurred to a considerable extent. In this case, solid particles, accelerated by high gas velocity destroyed rapidly the pipe walls in the delivery head. Moreover, wear occurred on the hydraulically lockable closure element of the device according to DE 28 50 121 C3. In addition, the size reduction effectiveness for the charge material strands of the steam jets was not always sufficient because of the existing geometric proportions.

The configuration of the proposed device with a delivery head mounted in the extruder axis, as illustrated in FIG. 1, shows advantages in comparison with the known device. Besides, the increased number of possibilities for feeding of high-pressure gas or liquid with high pressure an improved effectiveness for desagglomerating the strand of charge material is achieved. If such a configuration is provided as an axial device in the form of a lateral introduction into a horizontally or vertically installed reactor, it eliminates the 90° deflection in the delivery section with the possible drawbacks relative to size reduction effectiveness and wear behaviour.

The dimensioning of the nozzle for the strand of charge material will be within the preferred proportions of length to diameter of 1:1 to 5:1, especially 2:1 to 3:1. The nozzle for the strand of charge material, through which it flows into the pressure space of the reactor must not be too long, since there would be danger of an obstruction, depending, within certain limits, also on the properties and temperature of the strand of charge material to be conveyed.

The nozzle for the strand of feed material connected to the extruder can be equipped with internal bars or barriers which allows the extrusion of strands with a clefted respectively cleaved cross section or of strands with hollow profiles.

With the proposed device also is provided, for start-up in the reactors for said processes and as a safety shutoff in the case of shutdown or disruptions, a quick circuit-breaking device, which has the purpose, to reliably prevent the discharge or backfire of possibly very reactive process gases.

BRIEF DESCRIPTION OF THE DRAWINGS

Various other objects, features and attendant advantages of the present invention will be more fully appreciated as the same becomes better understood from the following detailed description when considered in connection with the accompanying drawings in which like references characters designate like or corresponding parts throughout the several views and wherein:

FIG. 3 is a cross sectional side view of FIG. 2, seen from the downstream side of the extruder in cross section with a shutoff piston in the open position;

FIG. 3a corresponds to FIG. 3, but with the shutoff piston in the closed position.

DETAILED DESCRIPTION OF THE PREFERRED EMBODIMENT

Figure 1:
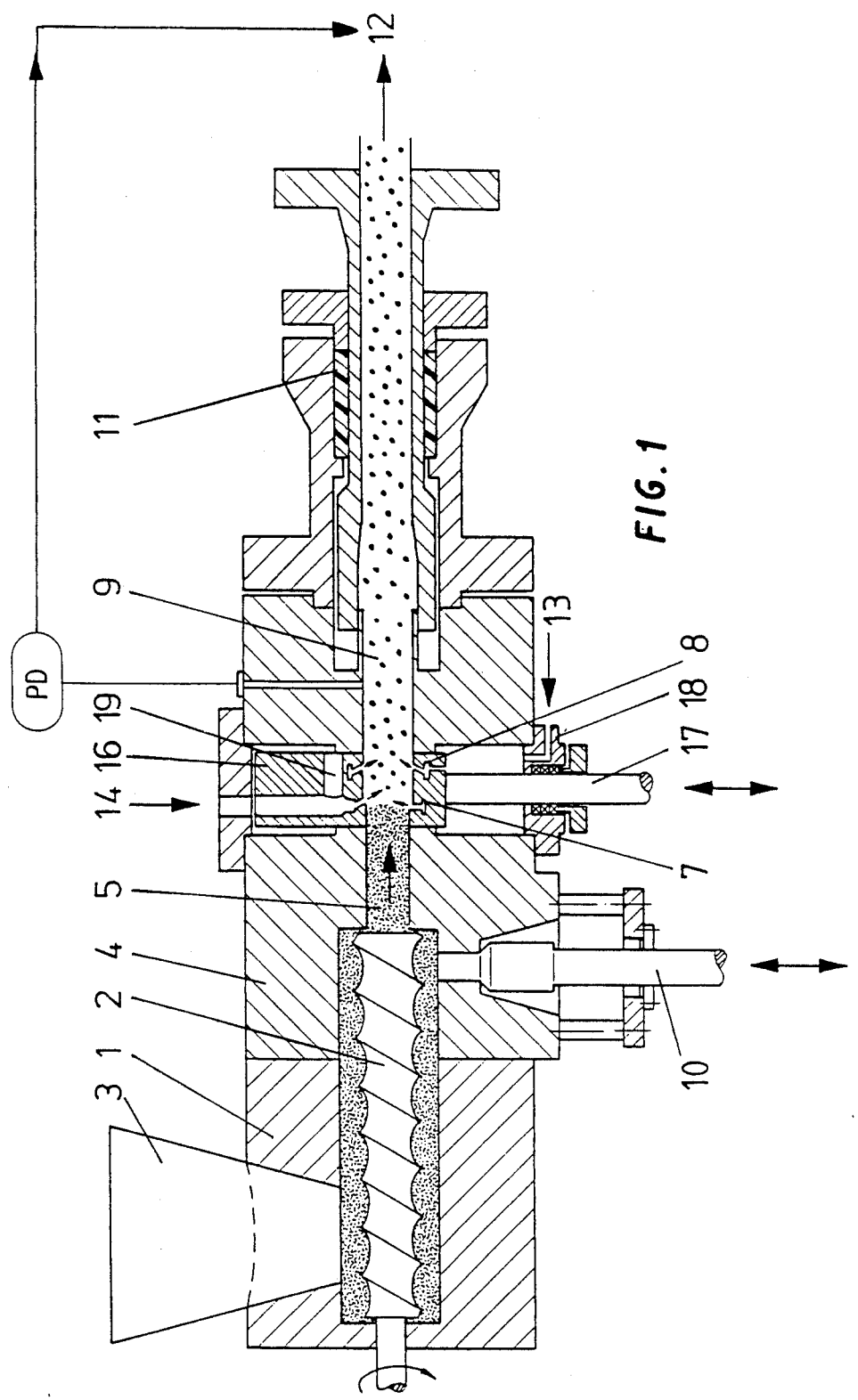
FIG. 1 is a cross sectional side view of the extruder with an axial delivery head.

According to FIG. 1 the solid particulate material is fed by a feeding device (3) to the feed zone of extruder (1). The material is conveyed against the reactor pressure by screw conveyor (s) (2) through delivery head (4), through nozzle (5) for the feed material via shutoff piston (16) as the closure member into extension pipe (9). Shutoff piston (16) is caused to axially move in two directions by actuation element (17). A high-pressure gas or a liquid under high pressure (14) is fed to the solid by ring line (7) and a connected multitude of nozzle bores in shutoff piston (16).

Additional high-pressure gas or liquid under high pressure can be fed to the solid by ring pipe (8) and a connected multitude of nozzle bores in shutoff piston (16).

The further conveying of the desagglomerated strand of feed material into reactor (12) takes place via connecting pipe (9) which is axially aligned with respect to the extruder. An expansion joint (11) is integrated between delivery head (4) and reactor (12). The expansion joint is a stuffing-box type compensator.

By arrangement of a pressure difference measurement device PD with sensors inside the gasification reactor (12) and inside connecting pipe (9) a change in the pressure conditions is immediately detected, as a result of which a quick shutoff of the reactor is triggered by a device (not shown) which controls actuation element (17).

A bypass plunger (10) is actuated as follows when extruder (1) is started up or shut down. Before actuation of shutoff piston (16), switching into the illustrated ON or open position, the extruder runs with bypass plunger (10) open and piston (16) closed until a steady state is established. Then bypass plunger (10) is closed and shutoff piston (16) is opened. The figure shows bypass pluger (10) in OFF position and shutoff piston (16) in ON position.

Moderator gas or inert gas (13) is fed by bores (18), which go through the bearing for guiding actuation element (17). In the OFF position of shutoff piston (16), provision is made for free flowing of pressurized gas or liquid (14) into connecting pipe (9) via bore or duct (19) and ring ducts (7,8) and the corresponding multitude of nozzle bores.

Figure 2:
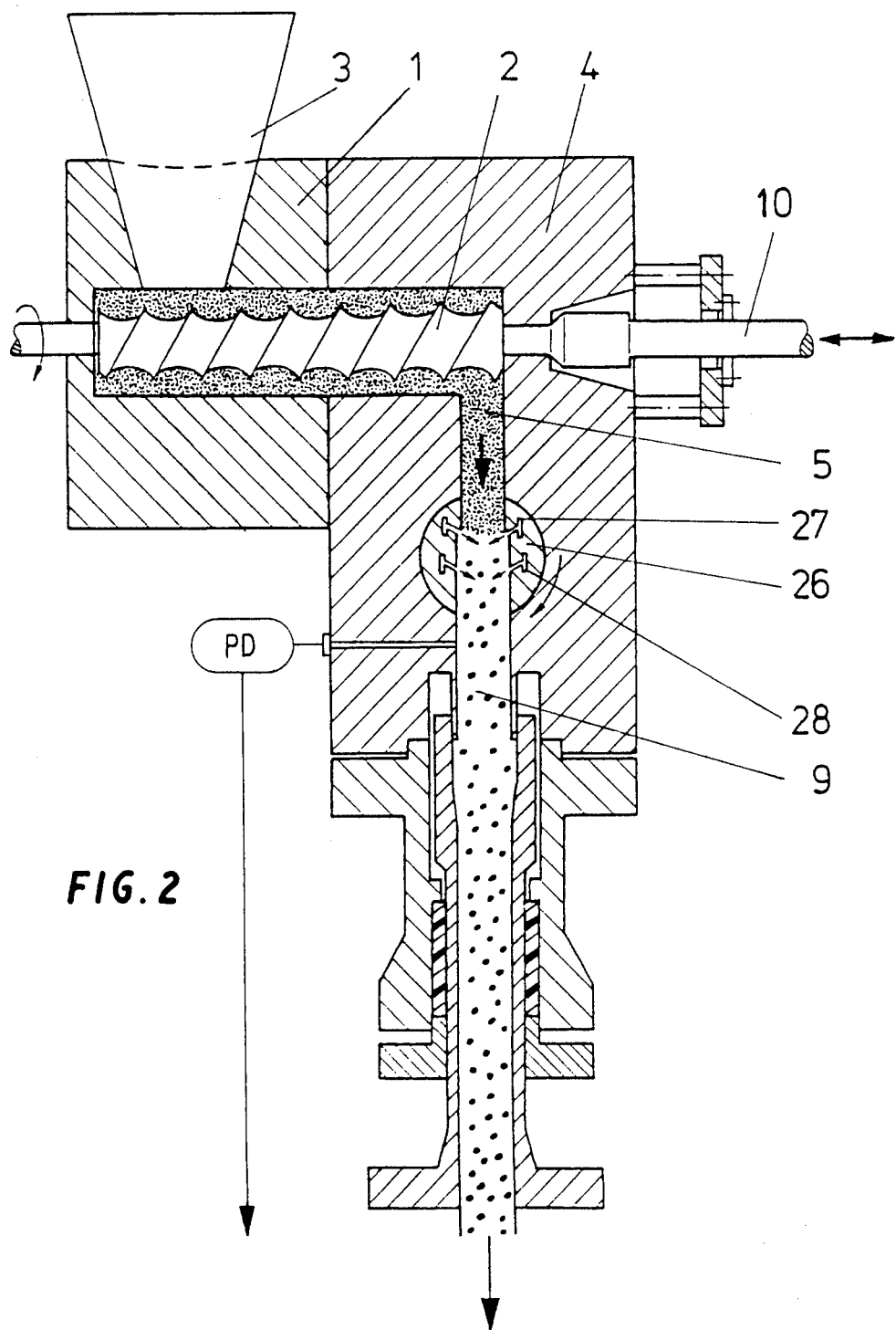
FIG. 2 is a cross section of an extruder with a transverse or lateral delivery head.

According to FIG. 2, ring ducts (27) and (28) with connected nozzle bores connecting with the passage opening of shutoff element (26), are shown. Shutoff element (26) is shown in open position and is made as a rotary piston. The ring ducts (27) and (28) intended for supplying by corresponding bores the high-pressure gas or liquid. Nozzle (5) for the strand of feed material and downpipe (9) are aligned perpendicular to the horizontal extruder axis. The embodiment of FIG. 2 is otherwise like that of FIG. 1.

FIG. 3 shows a twin-screw embodiment of an extruder with shutoff piston (36) in its ON position. Access of a high-pressure gas or a fluid (30) or (33) is made possible by bores (31), (39), ring ducts (37) and (38) and the connected multitude of nozzle bores, which connect with nozzle (35).

FIG. 3a corresponds to FIG. 3 with the difference that the OFF.position of rotary piston (36) is shown. Moderator or inert gas (30) is conducted to the reactor by corresponding bores (31) in rotary bearing (34) for rotary piston (36) and bore (32) in rotary piston (36). This is especially important in starting up to warm up or run the downpipe free before opening rotary piston (36) in the ON position. In the case of shutdown, the downpipe after closing of cutoff piston (36) is also run free of solids by means of moderator or inert gas (30) from bore or duct (32).

Figure 4:
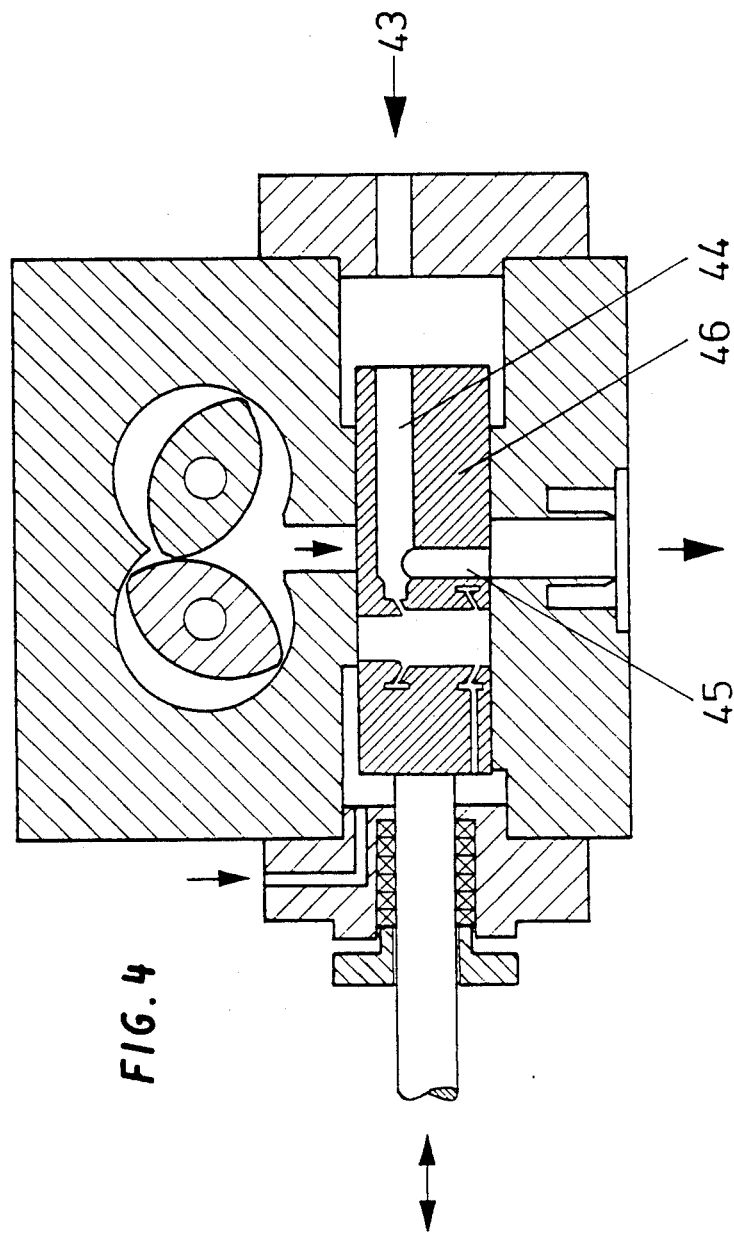
FIG. 4 is a side view of an extruder with transversely respectively laterally connected delivery head in cross section and with a shutoff element designed as a sliding element in a closed position.

FIG. 4 shows an embodiment of the closure member (46) as a sliding piston in the OFF position for the strand of feed material from the twin-screw extruder. Startup duct or shutdown duct (44, 45) for feeding moderator or inert gas (43) when the piston (46) is in the OFF position, is integrated in sliding piston (46).

The following gasification operation was performed with hard coal as solid fuel with a device as described:

| Solid throughput | 1000 kg/h hard coal |
|---|---|
| Added water/amount of steam | 575 kg/h water |
| Amount of oxygen | 970 kg/h $O_2$ |
| Reactor pressure | 50 bars |
| Reactor temperature | 1450° C. |
| Carbon reaction | 99% |
| Gas composition the product gas | |
| $H_2$ | 37.3% by vol. |
| CO | 48.0% by vol. |
| $CO_2$ | 11.8% by vol. |
| $H_2S$ | 0.1% by vol. |

| | |
|---|---|
| N$_2$ | 2.0% by vol. |
| CH$_4$ | 0.02% by vol. |
| H$_2$/CO ratio | 0.77 mol/mol |

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A process for feeding of solid particulate or fluid carbonaceous materials or mixtures of such materials into reactor spaces operating under pressure, comprising the steps of:

using at least one screw conveyor rotatable in a closely fitting housing for conveying and compressing the feed material into a plug of compressed feed material which is impervious at the pressure predominating in the reactor and is continuously renewed as it enters the latter as a strand of feed material;

conveying the strand via a delivery head having a nozzle into the reactor; and using a closure member provided with a passage opening through which passes said strand in said delivery head for shutting off the flow of feed material to the reactor pressure space as well as any appreciable backflow of process gases from the reactor into the screw conveyor area, wherein said process includes the step of disintegrating the strand of feed material at a position of the flow thereof between said delivery head and said pressure space, said disintegrating step comprising directing high pressure fluid media at normal or elevated temperature through nozzles and onto said strand of feed material, wherein said high pressure fluid media are fed at high pressure via bores leading through said closure member and nozzles which are in connection with said bores into said passage opening of the closure member through which said strand passes.

2. The feeding process of claim 1 wherein said solid particles or fluid materials compressed in said compressing step are mixed with one material from the group consisting of a suspending agent, a binding agent, a lubricant, a not easily pumpable suspension, and a pasty or viscous stock or melt.

3. The feeding process of claim wherein said high pressure fluid media are of a type capable of acting as reagents for oxidizing, reducing or catalyzing said strand of feed material.

4. The feeding process of claim 3 wherein carbonaceous feed materials are reacted in a refractory lined reaction zone of a free-flow noncatalytic unpacked partial oxidation synthesis gas reactor with an oxygen containing gas at elevated temperature and elevated pressure.

5. The feeding process of claim 3 wherein said high pressure fluid media comprise steam.

6. The feeding process of claim 1, wherein said strand of feed material comprises solid carbonaceous material in a mixture with one from the group consisting of residual oil and heavy oil and wherein said pressure space comprises means for slurry phase hydrogenation at elevated temperature and elevated pressure.

7. The feeding process of claim 1 wherein said strand of feed material comprises extractable materials and said pressure space comprises a pressure extraction reactor.

8. The feeding process of claim 1 wherein said strand of feed material comprises a carbonaceous material which can be pyrolyzed at elevated temperatures and said pressure space comprises means for high pressure pyrolysis.

9. The feeding process of claim 1 wherein said high pressure fluid media comprise high pressure gas having a velocity of between 30 meters/sec. and sonic velocity.

10. The feeding process of claim 1 wherein said disintegrating step comprises a first step of feeding a gas at a pressure at which a supercritical expansion occurs and a second step of feeding a gas at between 30 meters/sec. and sonic velocity.

11. The feeding process of claim 2 including the step of heating said mixed material.

12. The feeding process of claim 11 wherein said heating step comprises shearing in said screw conveyor.

* * * * *

UNITED STATES PATENT AND TRADEMARK OFFICE
CERTIFICATE OF CORRECTION

PATENT NO. : 4,978,369
DATED : December 18, 1990
INVENTOR(S) : Bernd Pontow et al.

It is certified that error appears in the above-identified patent and that said Letters Patent is hereby corrected as shown below:

The Assignees information is incorrect, should be, --VEBA OEL Entwicklungs-Gesellschaft mbH, Gelsenkirchen; Werner & Pfleiderer GmbH, Stuttgard, both of Fed. Rep. of Germany--.

Signed and Sealed this

Seventeenth Day of November, 1992

*Attest:*

DOUGLAS B. COMER

*Attesting Officer*     *Acting Commissioner of Patents and Trademarks*